US009592884B2

United States Patent
Aldenhoevel

(10) Patent No.: US 9,592,884 B2
(45) Date of Patent: Mar. 14, 2017

(54) MOTORCYCLE AND MOTORCYCLE REAR WHEEL SWINGARM WITH INTEGRATED RESONATOR

(71) Applicant: Bayerische Motoren Werke Aktiengesellschaft, Munich (DE)

(72) Inventor: Ralf Aldenhoevel, Kaufering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/057,411

(22) Filed: Mar. 1, 2016

(65) Prior Publication Data

US 2016/0176476 A1 Jun. 23, 2016

Related U.S. Application Data

(63) Continuation of application No. PCT/EP2014/067798, filed on Aug. 21, 2014.

(30) Foreign Application Priority Data

Sep. 2, 2013 (DE) .................. 10 2013 217 385

(51) Int. Cl.
| | | |
|---|---|---|
| *F01N 1/02* | (2006.01) | |
| *B62M 7/02* | (2006.01) | |
| *B62K 25/28* | (2006.01) | |
| *F01N 13/00* | (2010.01) | |

(52) U.S. Cl.
CPC ............. *B62M 7/02* (2013.01); *B62K 25/28* (2013.01); *B62K 25/283* (2013.01); *F01N 1/02* (2013.01); *F01N 1/023* (2013.01); *F01N 13/001* (2013.01); *F01N 2340/00* (2013.01); *F01N 2470/20* (2013.01); *F01N 2490/14* (2013.01); *F01N 2490/18* (2013.01); *F01N 2590/04* (2013.01)

(58) Field of Classification Search
CPC .. B62M 7/02; B26K 25/28; F01N 1/02; F01N 1/23
USPC ......................................................... 181/227
See application file for complete search history.

(56) References Cited

U.S. PATENT DOCUMENTS 4,545,200 A * 10/1985 Oike ....................... F01N 1/166
 180/219
5,388,408 A * 2/1995 Lawrence .............. B60K 13/04
 181/228

(Continued)

FOREIGN PATENT DOCUMENTS

DE 386 668 A 12/1923
DE 10 2008 030 377 A1 1/2009

(Continued)

OTHER PUBLICATIONS

International Search Report (PCT/ISA/210) issued in PCT Application No. PCT/EP2014/067798 dated Nov. 18, 2014 with English-language translation (six (6) pages).

(Continued)

*Primary Examiner* — Forrest M Phillips
(74) *Attorney, Agent, or Firm* — Crowell & Moring LLP

(57) ABSTRACT

A motorcycle has an engine and an exhaust gas pipe which is connected thereto, as well as a motorcycle rear wheel swingarm. The motorcycle rear wheel swingarm has a closed cavity which is in fluid connection with the exhaust gas pipe by way of a connecting element.

11 Claims, 2 Drawing Sheets

(56) References Cited

U.S. PATENT DOCUMENTS

2009/0000282 A1* 1/2009 Gruber .................. F01N 1/02
60/299
2010/0270098 A1* 10/2010 Buell .................. F01N 13/001
180/225

FOREIGN PATENT DOCUMENTS

| EP | 1 939 415 A1 | 7/2008 |
|----|--------------|--------|
| JP | 2007-205204 A | 8/2007 |

OTHER PUBLICATIONS

German-language Written Opinion (PCT/ISA/237) issued in PCT Application No. PCT/EP2014/067798 dated Nov. 18, 2014 (six (6) pages).

German Search Report issued in counterpart German Application No. 10 2013 217 385.7 dated Dec. 9, 2013 with partial English-language translation (ten (10) pages).

\* cited by examiner

MOTORCYCLE AND MOTORCYCLE REAR WHEEL SWINGARM WITH INTEGRATED RESONATOR

CROSS REFERENCE TO RELATED APPLICATIONS

This application is a continuation of PCT International Application No. PCT/EP2014/067798, filed Aug. 21, 2014, which claims priority under 35 U.S.C. §119 from German Patent Application No. 10 2013 217 385.7, filed Sep. 2, 2013, the entire disclosures of which are herein expressly incorporated by reference.

BACKGROUND AND SUMMARY OF THE INVENTION

The invention relates to a measure for reducing noise in motorcycles. For this purpose, a motorcycle having an engine and an exhaust pipe connected thereto, together with a motorcycle rear wheel swingarm are proposed, the latter having an integrated resonator connected to the exhaust pipe.

Ever more stringent noise regulations for motorcycles, in particular the internal combustion engine in operation, make it necessary to constantly develop new measures for reducing the noise level emitted by the motorcycle. In principle, the noise level is limited by the rear muffler, but without additional measures muffler volumes would in the future have to be made significantly larger in order to be able to adhere to the noise levels. However, a larger rear muffler is not desirable, for two reasons. Firstly, on motorcycles rear mufflers are one of the main design elements and therefore must not exceed a predefined size. Secondly, larger rear mufflers increase the weight and take up more overall space, which on motorcycles is something to be avoided in any event.

The use of resonators interacting with the exhaust pipe is known in the state of the art in automobiles. Here a sheet metal body, which acts as resonator, is attached to a branch on the exhaust pipe. Such a solution is not feasible on motorcycles, since the arrangement of an additional, external resonator on the exhaust pipe would be unacceptable both from visual and functional standpoints.

Against this background, the object of the invention is to provide a possible means of reducing the noise level of a motorcycle during operation, while allowing unmodified use of the existing rear mufflers.

This and other objects are achieved by a motorcycle in which the rear wheel swingarm comprises an enclosed cavity, which is in fluid connection with the exhaust pipe by a connecting element. The cavity integrated into the motorcycle rear wheel swingarm in this way serves as resonator, which is capable of reducing the engine noise level from the exhaust system by at least two decibels.

The motorcycle rear wheel swingarm is advantageously formed as a hollow-chamber profile, preferably as a cast aluminum welded construction, in order to meet the requisite demands in terms of lightweight construction. In such a hollow motorcycle rear wheel swingarm a predefined area is provided as an enclosed cavity, which acts as an acoustic resonator. The cavity integrated into the swingarm therefore constitutes a resonance cavity. It is particularly advantageous here if the cavity is formed as a Helmholtz resonator, in which natural vibrations are excited by sound waves when the frequency of part of the sound in the exhaust pipe coincides with the natural frequency of the quantity of air present therein. For each engine and its associated exhaust system it is possible, by adjusting the cavity volume and the length and diameter of the connecting element, to set the required frequency range in which the resonator is intended to be effective. Here, hot exhaust gas does not flow directly through the resonator itself; instead a standing column of air in the connecting element oscillates together with the quantity of air in the resonator.

In a preferred embodiment, a temperature-resistant hose, for example a flexible metal hose or a temperature-resistant elastomer hose, is used as the connecting element. The connecting element is preferably of a flexible design and capable of compensating for relative movements between the rear wheel swingarm and the exhaust pipe. The connecting element is advantageously connected to the cavity in the rear wheel swingarm in close proximity to the axis of rotation of the swingarm, in order to minimize relative movement during compression and rebound.

The connecting element or the temperature-resistant hose is fixed both to the cavity of the motorcycle rear wheel swingarm and to the exhaust pipe by connection fittings formed on each of them, onto which the hose can be pushed and secured/fixed by use of fixing clamps.

A beneficial effect of the cavity or resonator integrated into the rear swingarm is obtained if the connecting element or the hose is connected to the exhaust pipe upstream of the rear muffler and downstream of the catalytic converter, viewed in a direction of flow of the exhaust gas. This design is also arrived at by extending the exhaust pipe along the rear swingarm, before it opens into the rear muffler.

For adjustability of the frequency range of the cavity acting as resonator, the latter has a volume of 1000 to 3000 $cm^3$, preferably 1800 to 2600 $cm^3$ for standard commercial motorcycles. In an advantageous embodiment the length of the connecting element is 120 to 250 mm, more preferably 150 to 200 mm. In an advantageous embodiment the diameter of the connecting element is 30 to 40 mm, more preferably 30 to 35 mm. The respective values may be varied and adjusted in order to afford the best possible sound-reducing effect on the respective engine, exhaust pipe and rear muffler system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
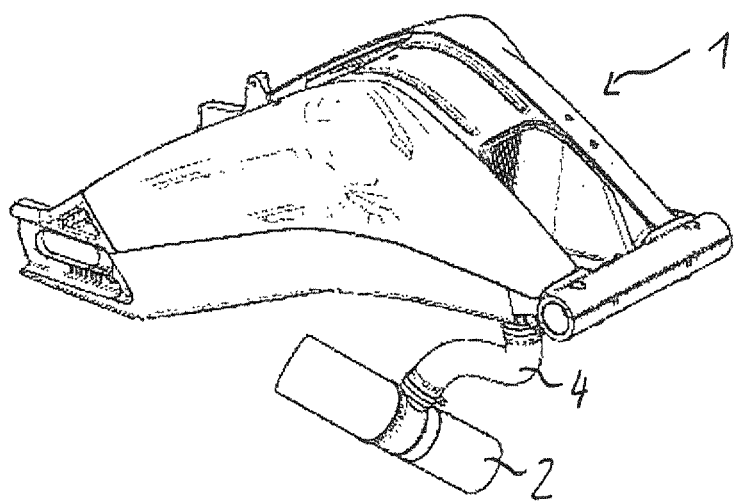
FIG. 1 is a perspective view of a motorcycle rear wheel swingarm.

The figures are diagrammatic examples. The same reference numerals denote the same parts in all views.

FIG. 1 represents a perspective view of a motorcycle rear wheel swingarm (rear wheel fork) 1 formed as a hollow-chamber profile with an exhaust pipe 2 extending at a lateral distance therefrom. Only a short portion of the exhaust pipe 2 is represented; the further extent to the rear muffler and to the engine is omitted for reasons of clarity. A temperature-resistant hose 4 extends from the exhaust pipe 2 to the motorcycle rear wheel swingarm and provides a flow connection between the exhaust pipe 2 and a cavity 3 of the motorcycle rear wheel swingarm 1, so that a standing column of air or column of exhaust gas in the connecting element can oscillate together with the quantity of air in the cavity 3 as a function of the engine speed and load.

Figure 2:
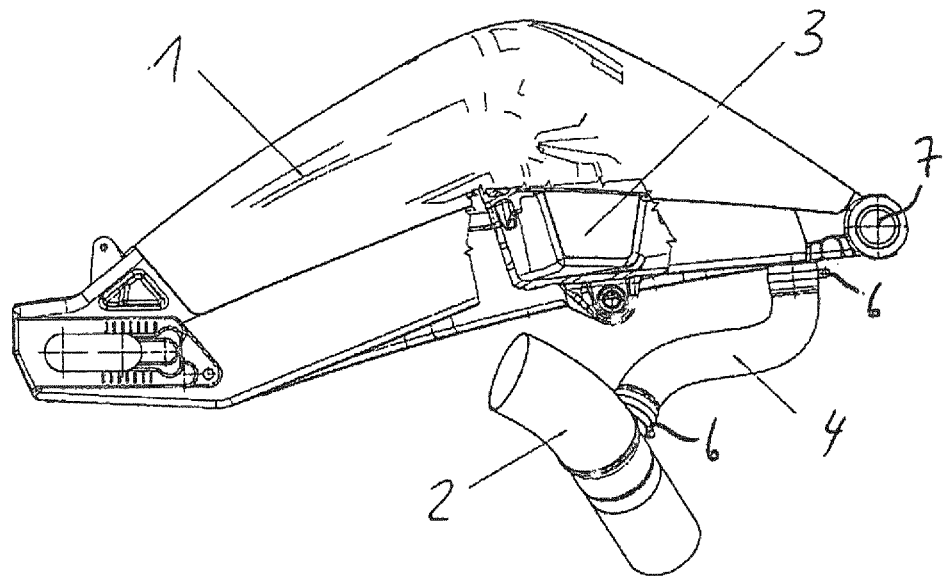
FIG. 2 is a side view of the motorcycle rear wheel swingarm according to FIG. 1, partially cut away.

FIG. 2 shows a side view of the motorcycle rear wheel swingarm 1 in FIG. 1, the area comprising the enclosed cavity 3 being represented partially cut away. At the bottom the hose 4 is fixed to the motorcycle rear wheel swingarm 1 immediately adjacent to the swingarm center of rotation 7, since here the the relative movement is slight. The cavity 3 is formed as a Helmholtz resonator, the enclosed cavity 3 of which is substantially box-shaped. Alternatively, it would also be possible for this to be formed as a rectangular solid or with a rounded and also, in particular, circular shape. The volume shown is approximately 2500 cm$^3$, but this may be modified according to the arrangement of the exhaust system and as a function of the desired frequency spectrum. The same applies to the dimensioning of the hose 4, the length and diameter of which have a direct influence on the effect of the cavity 3. In the embodiment, the hose is approximately 160 mm long and 32 mm in diameter.

Figure 3:
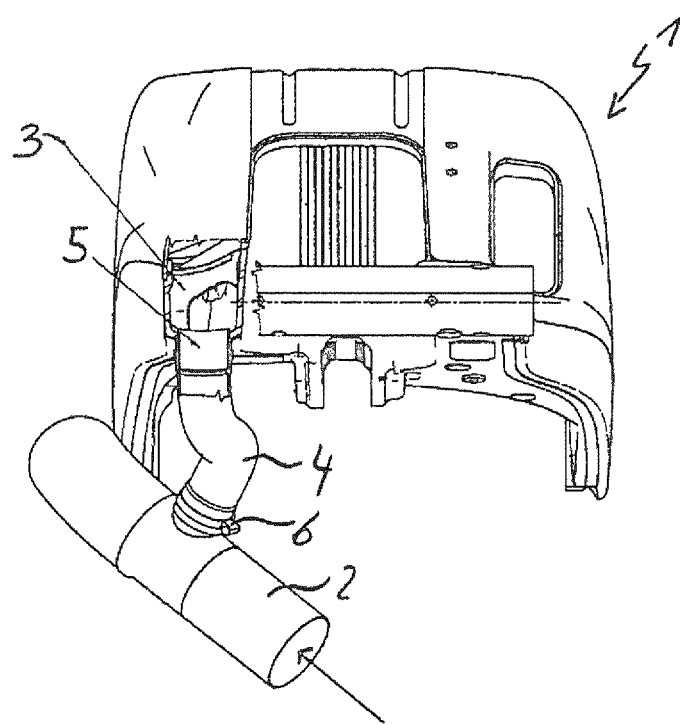
FIG. 3 is a front view of the motorcycle rear wheel swingarm in FIG. 1, partially cut away.

FIG. 3 represents a front view of the embodiment in FIG. 2, the connection of the hose 4 to the cavity 3 being shown cut away. FIG. 3 shows the connection fitting 5, which is formed on the motorcycle rear wheel swingarm 1 in the area of the cavity 3 and onto which the hose 4 is pushed and secured by means of a clamping band 6. A corresponding attachment is also provided on the exhaust pipe 2.

The invention is not limited to the preferred exemplary embodiments described above, but rather encompasses variants which also make use of the solution represented in embodiments of fundamentally different type. For example, the connecting element may also be attached laterally to the swingarm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle, comprising:
an engine;
an exhaust pipe coupled with the engine;
a rear wheel swingarm, wherein
the rear wheel swingarm comprises an enclosed cavity in fluid communication with the exhaust pipe via a connecting element branching away from the exhaust pipe, the cavity being configured as a Helmholtz resonator with no aperture other than at a location where the connecting element communicates with the cavity.

2. The motorcycle according to claim 1, wherein the rear wheel swingarm has a hollow-chamber profile.

3. The motorcycle according to claim 1, wherein the connecting element is a temperature-resistant hose.

4. The motorcycle according to claim 1, wherein the connecting element is fixed to the cavity and the exhaust pipe via respective connection fittings.

5. The motorcycle according to claim 1, wherein the connecting element is connected to the exhaust pipe upstream of a rear muffler and downstream of a catalytic converter when viewed in an exhaust gas flow direction.

6. The motorcycle according to claim 1, wherein the cavity has a volume of 1,000-3,000 cm$^3$.

7. The motorcycle according to claim 6, wherein the connecting element has a length of 120-250 mm.

8. The motorcycle according to claim 1, wherein the connecting element has a length of 120-250 mm.

9. The motorcycle according to claim 7, wherein the connecting element has a diameter of 30-40 mm.

10. The motorcycle according to claim 1, wherein the connecting element has a diameter of 30-40 mm.

11. A motorcycle component, comprising:
a rear wheel swingarm, wherein the rear wheel swingarm comprises an integrated cavity configured as a Helmholtz resonator, and
the cavity being configured for a fluid communication with a branch from an exhaust pipe, and having no aperture other than at a location where the cavity communicates with the exhaust pipe.

* * * * *